(12) United States Patent
Zhou

(10) Patent No.: US 10,488,548 B2
(45) Date of Patent: Nov. 26, 2019

(54) METHOD FOR EVALUATING FORMATIONS USING NEUTRON INDUCED GAMMA RAY MEASUREMENTS

(71) Applicant: Schlumberger Technology Corporation, Sugar Land, TX (US)

(72) Inventor: Tong Zhou, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/014,040

(22) Filed: Jun. 21, 2018

(65) Prior Publication Data

US 2018/0313973 A1 Nov. 1, 2018

Related U.S. Application Data

(63) Continuation of application No. 14/823,532, filed on Aug. 11, 2015.

(51) Int. Cl.
*G01V 5/10* (2006.01)

(52) U.S. Cl.
CPC .............. *G01V 5/102* (2013.01); *G01V 5/101* (2013.01)

(58) Field of Classification Search
CPC ................................ G01V 5/102; G01V 5/101
See application file for complete search history.

(56) References Cited

U.S. PATENT DOCUMENTS

| | | | |
|---|---|---|---|
| 3,108,188 A | 10/1963 | Dewan et al. | |
| 4,471,435 A * | 9/1984 | Meisner | G01V 5/102 250/262 |
| 4,926,044 A | 5/1990 | Wraight | |
| 5,086,224 A | 2/1992 | Roscoe et al. | |
| 5,699,246 A | 12/1997 | Plasek et al. | |
| 6,703,606 B2 | 3/2004 | Adolph | |
| 7,365,307 B2 | 4/2008 | Stoller et al. | |
| 2003/0101011 A1 | 5/2003 | Odom et al. | |
| 2012/0043966 A1 | 2/2012 | Montaron | |
| 2012/0197529 A1 | 8/2012 | Stephenson et al. | |

(Continued)

FOREIGN PATENT DOCUMENTS

EP 2275840 A1 1/2011

OTHER PUBLICATIONS

Chapter 13: Basic Neutron Physics for Logging Applications. Well Logging for Earth Scientists. Ed. Darwin V. Ellis and Julian M. Singer. 2nd ed., Springer 2007. pp. 325-344.

(Continued)

*Primary Examiner* — Hugh Maupin
(74) *Attorney, Agent, or Firm* — Trevor G. Grove

(57) ABSTRACT

A method for evaluating a formation includes determining a number of detected gamma rays resulting from imparting neutrons into a formation. The detected gamma rays are each characterized by an energy level thereof. The gamma rays are detected at a first distance from a position of imparting the neutrons into the formation. Those of the detected gamma rays attributable to neutron capture by hydrogen nuclei are removed from the number of detected gamma rays. The number of detected gamma rays having hydrogen neutron capture gamma rays removed therefrom are used to calculate a property of the formation.

16 Claims, 8 Drawing Sheets

(56) References Cited

U.S. PATENT DOCUMENTS

2013/0211724 A1* 8/2013 Fitzgerald ............ G01V 5/101
702/8
2017/0045639 A1 2/2017 Zhou

OTHER PUBLICATIONS

Chapter 14: Neutron Porosity Devices. Well Logging for Earth Scientists. Ed. Darwin V. Ellis and Julian M. Singer. 2nd ed., Springer 2007. pp. 351-377.
Chapter 15: Pulsed Neutron Devices and Spectroscopy. Well Logging for Earth Scientists. Ed. Darwin V. Ellis and Julian M. Singer. 2nd ed., Springer 2007 pp. 383-414.

* cited by examiner

METHOD FOR EVALUATING FORMATIONS USING NEUTRON INDUCED GAMMA RAY MEASUREMENTS

CROSS-REFERENCE TO RELATED APPLICATIONS

This is a continuation application of U.S. application Ser. No. 14/823,532, filed on Aug. 11, 2015 and published on Feb. 16, 2017 as US2017/0045639, the entire content of which is hereby incorporated by reference into the current application.

STATEMENT REGARDING FEDERALLY SPONSORED RESEARCH OR DEVELOPMENT

Not applicable.

NAMES TO THE PARTIES TO A JOINT RESEARCH AGREEMENT

Not Applicable.

BACKGROUND

This disclosure is related to the field of neutron-induced radiation measurements for determining petrophysical properties of formations such as subsurface formations traversed by a wellbore. More specifically, the disclosure relates to using neutron induced gamma ray measurements to determine one or more petrophysical parameters of such formations.

Various neutron-induced radiation measurements have been used to evaluate characteristics of subsurface formations from a wellbore since as early as the 1950s. Neutrons can interact with subsurface formations in different ways. They can be scattered elastically, which means kinetic energy and momentum are conserved; they can be scattered inelastically, which means certain nuclei go into an excited state while kinetic energy is lost; they can also be captured by a nucleus to form a new nucleus; it is also possible that the neutron interaction causes a nuclear reaction resulting in the emission of one or more nucleons from the target nucleus. The probability of a neutron interacting with a nucleus is measured by the respective interaction cross section, which is a function of many parameters, such as incident neutron energy, outgoing neutron energy (if a neutron emerges from the interaction), scattering angle, interaction type and interactive nucleus type, among others. Thus, neutrons can enable measurement of many different formation properties due to the variety and complexity of their interactions.

One important wellbore neutron measurement known in the art is the neutron porosity measurement. The basic principle of such measurement is to impart high energy neutrons (typically several million electron volts—"MeV"—depending on the neutron source type) into the formation and to measure the thermal (or epithermal) neutron flux at one or more certain distances from the neutron source. The one or more detectors can be either neutron detectors such as helium-3 proportional counters, or gamma ray detectors such as scintillation counters. Gamma ray detectors measured neutron induced gamma rays as an indirect measurement of the neutron flux. In many neutron porosity well logging instruments, a ratio of detected radiation event (count) rate between a detector spaced from the neutron source at a first axial distance with respect to the detected count rate at a second, longer axial spacing from the source is used to determine neutron porosity.

The neutron porosity measurement is very sensitive to the hydrogen content in the formation because hydrogen is the most effective neutron moderator among all elements found in earthen formations. High hydrogen content can slow down neutrons to thermal energy (0.025 eV at room temperature) before they can travel an appreciable distance. Thus, HI (Hydrogen Index) and porosity (fresh water-filled) may be readily determined from such measurements. Therefore, using numbers of detected radiation events related to numbers of thermal neutrons has proven effective in determining formation porosity. A limitation of the neutron porosity measurement is that it is accurate only for fresh water-filled, clean (clay free) single lithology (such as sandstone, limestone and dolomite) formations. Some other environmental conditions need special treatment, such as gas-filled porosity, shale, and complex lithology. In addition, thermal neutron porosity measurement is sensitive to various environment effects including temperature and borehole and formation salinity.

It is more difficult to measure HI or neutron porosity based on measurements from gamma ray detectors as compared to measurements from neutron detectors. Gamma ray detectors measure the "prompt" gamma rays from neutron capture interaction in formation, wellbore or the well logging instrument. One may define "neutron-neutron porosity" as neutron porosity based on a neutron source and neutron detector(s) and may define "neutron-gamma porosity" as neutron porosity based on a neutron source and gamma ray detector(s). The physics of measuring "neutron-neutron porosity" only relates to neutron transport within the well logging instrument, the wellbore and the formations. The physics of measuring "neutron-gamma porosity" relates to both neutron and gamma ray transport, so that it is more complex. Thus, neutron-gamma porosity typically is more susceptible to environmental effects, and such measurements may be more difficult to interpret than neutron-neutron porosity measurements.

On the other hand, there may be advantages associated with measuring neutron-gamma porosity. The detected radiation event (count) rate of a gamma ray detector can be more than one order of magnitude higher than for a neutron detector given similar neutron source energy and neutron source output and relative detector spacing from the neutron source. The radial depth of investigation of neutron well logging instrument using one or more gamma ray detectors is typically deeper than for a similarly configured neutron-neutron well logging instrument. The energy of a prompt gamma ray from neutron capture is normally in the MeV range. Such high energy gamma rays can travel a longer distance in medial surrounding the well logging instrument than a thermal neutron before capture by atomic nuclei of certain materials in the formations. A gamma ray detector can also provide gamma ray spectroscopy and inelastic-gamma ray-based gas measurements, which neutron well logging instrument using thermal or epithermal neutron detectors, e.g., helium-3 proportional counters, cannot. The foregoing possible advantages make neutron-gamma porosity desirable to perform.

A limitation inherent to measuring neutron-gamma porosity is its loss of porosity sensitivity compared to neutron-neutron porosity, especially when formation fractional volume of pore space (porosity) exceeds about 30% (30 p.u.). A gamma ray near-spaced/far-spaced detector count rate ratio from a neutron-gamma porosity well logging instrument using conventional gamma ray detector analysis may exhibit negative sensitivity to porosity above about 30 p.u. In other words, a gamma ray detector count rate ratio can change in magnitude one way with respect to porosity between 0 to about 30 p.u., then it will change in the opposite way in a range from about 30 p.u. to 100 p.u. The relationship of gamma ray counting rates is therefore not a monotonic function of porosity.

SUMMARY

One aspect of this disclosure relates to a method for evaluating a formation. A method according to this aspect of the disclosure includes entering into a computer a number of detected gamma rays resulting from imparting neutrons into a formation. The detected gamma rays are each characterized by a respective energy level. The gamma rays are detected at a first distance from a position of imparting the neutrons into the formation. In the computer, removing the number of detected gamma rays attributable to neutron capture by hydrogen nuclei is removed from the number of detected gamma rays. In the computer the number of detected gamma rays having hydrogen neutron capture gamma rays removed is used to calculate a property of the formation.

Other aspects and advantages will be apparent from the description and claims that follow.

DETAILED DESCRIPTION

Figure 1A:
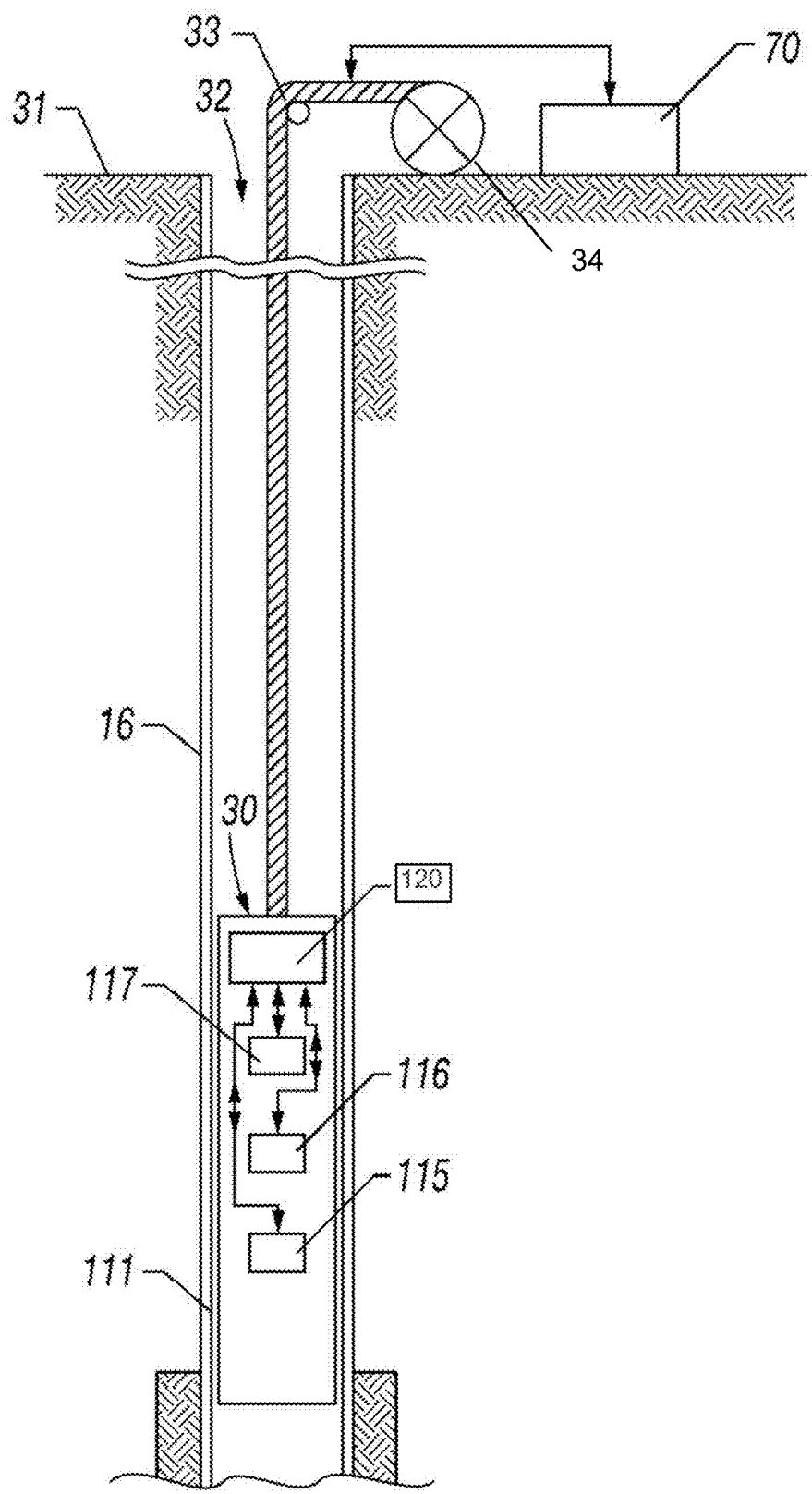
FIG. 1A shows an example well logging instrument conveyed through a wellbore by an electrical cable ("wireline").

FIG. 1A shows an example well logging instrument 30. The measurement components of the well logging instrument 30 may be disposed in a housing 111 shaped and sealed to be moved along the interior of a wellbore 32. The housing 111 may contain at least one neutron source such as electrically operated pulsed neutron source ("source") 115, and one or more detectors 116, 117 each disposed at different axial spacings from the source 115. The source 115 may emit neutron radiation. Shielding (FIG. 1D) may be disposed in the housing 111 and elsewhere between the source 115 and the detectors 116, 117 to reduce direct transmission of neutrons from the source 115 to the detectors 116, 117. Thus, detected radiation may be characterized at each of a plurality of axial distances from the source 115, and thus have different lateral response (depth of investigation) into the formations surrounding the wellbore 32. In some embodiments, two or more different types of well logging instruments, each having a different type of source and different types of corresponding detectors may be included in the same instrument assembly of "tool string."

The housing 111 maybe coupled to an armored electrical cable 33 that may be extended into and retracted from the wellbore 32 using a winch 34 or similar well known cable spooling device. The wellbore 32 may or may not include metal pipe or casing 16 therein. The cable 33 conducts electrical power to operate the instrument 30 from a recording system 70 deployed at the surface 31. Signals from the detectors 116, 117 may be processed by suitable circuitry 120 in the housing 111 for transmission along the cable 33 to the recording system 70. The recording system 70 may include a processor, computer or computer system as will be explained below with reference to FIG. 1C for analysis of the detected signals as well as devices for recording the signals communicated along the cable 33 from the instrument 30 with respect to depth and/or time.

The well logging instrument described above can also be adapted to be used, for example, in logging-while-drilling ("LWD") equipment. As shown, for example, in FIG. 1B, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. Alternatively, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, preferably near the drill bit 216. The BHA 236 may include subassemblies for making measurements, processing and storing information and for communicating with the Earth's surface. Such measurements may correspond to those made using the instrument string explained above with reference to FIG. 1A. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions as well as on the demands of the measurement.

Figure 1B:
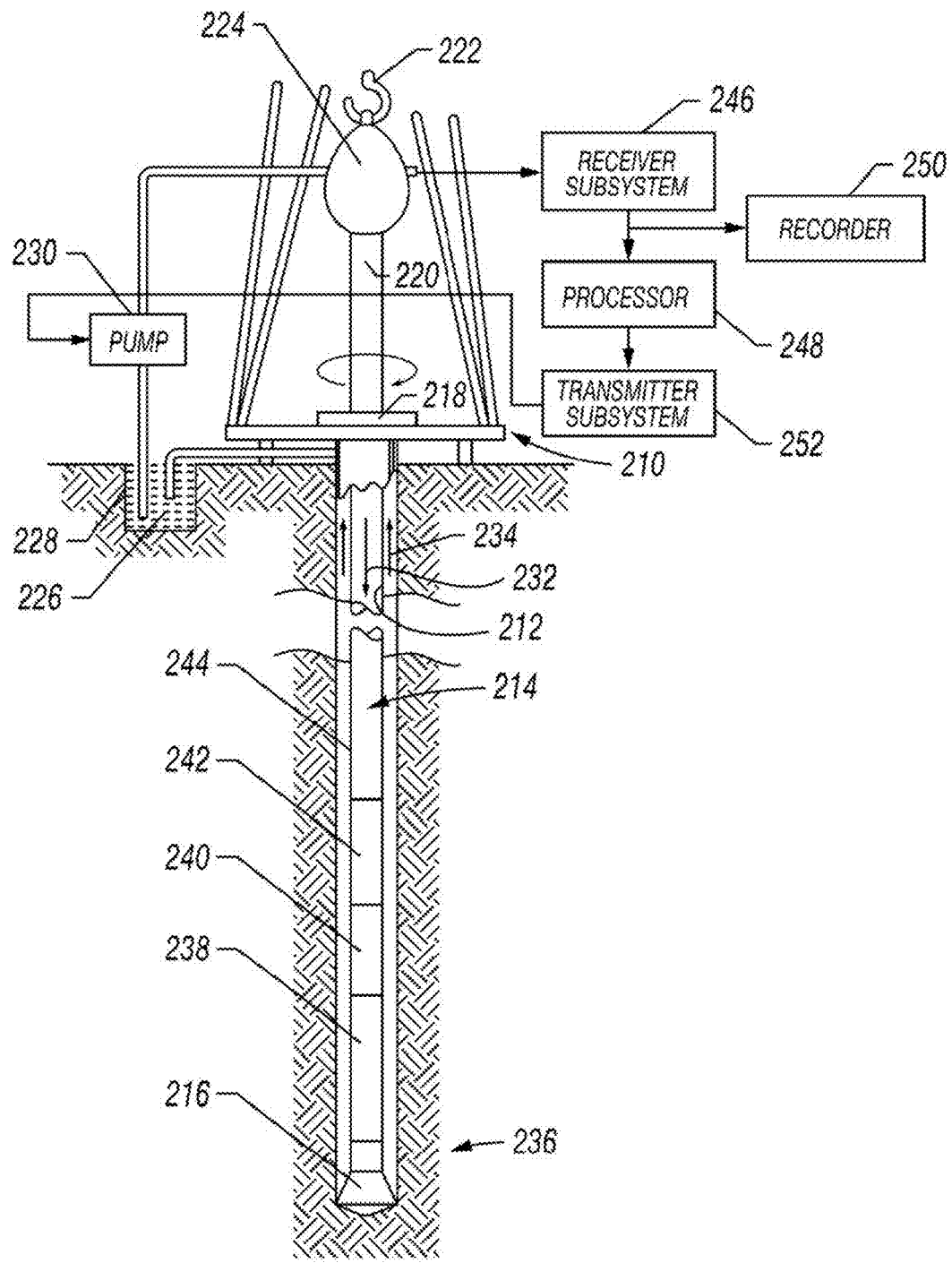
FIG. 1B shows an example logging while drilling instrument on a drill string.

In the arrangement shown in FIG. 1B, the components of the well logging instrument may be located in the drill collar section 240 above the stabilizer collar 238. Such components may, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing computations may be performed on a computer system such as one shown in the processor at 248 in FIG. 1B, or in the surface unit 70 in FIG. 1A. However, any computer or computers may be used to equal effect.

Figure 1C:
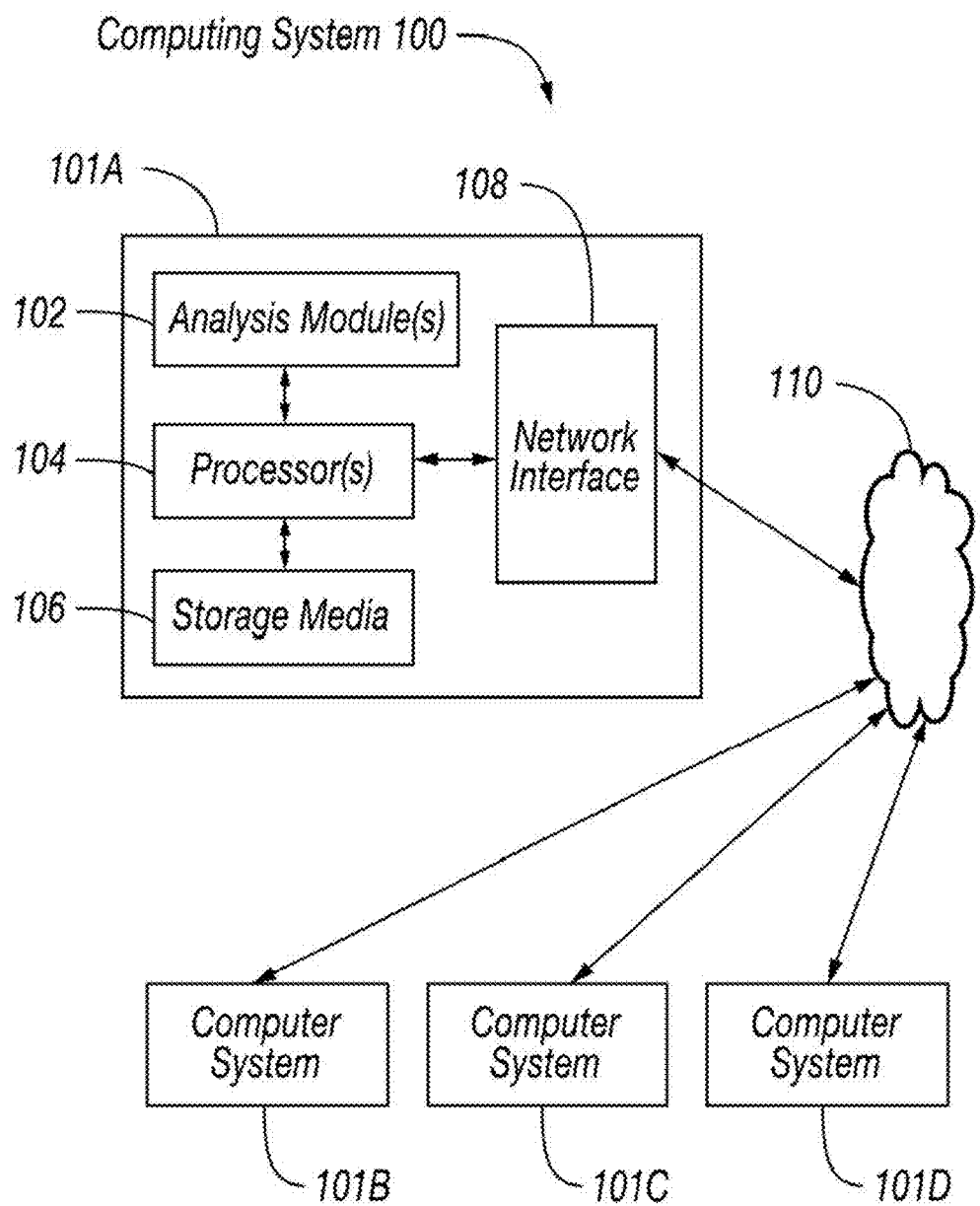
FIG. 1C shows an example computer system that may be used in some implementations.

FIG. 1C shows an example computing system 100 in accordance with some embodiments for carrying out example methods such as those to be explained below with reference to FIGS. 2 through 8. The computing system 100 may be an individual computer system 101A or an arrangement of distributed computer systems. The computer system 101A includes one or more analysis modules 102 that are configured to perform various tasks according to some embodiments, such as the tasks described above. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents). Any one or more of the computer systems may be disposed in the well logging instrument (whether wireline as in FIG. 1A or LWD as in FIG. 1B).

A processor can include a microprocessor, microcontroller, processor module or subsystem, programmable integrated circuit, programmable gate array, digital signal processor (DSP), or another control or computing device.

The storage media 106 can be implemented as one or more non-transitory computer-readable or machine-readable storage media. Note that while in the embodiment of FIG. 1C storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is(are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 1C, and/or computing system 100 may have a different configuration or arrangement of the components depicted in FIG. 1C. The various components shown in FIG. 1C may be implemented in hardware, software, or a combination of both hardware and software, including one or more signal processing and/or application specific integrated circuits.

Further, the steps in the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are all included within the scope of protection of the invention.

Figure 1D:
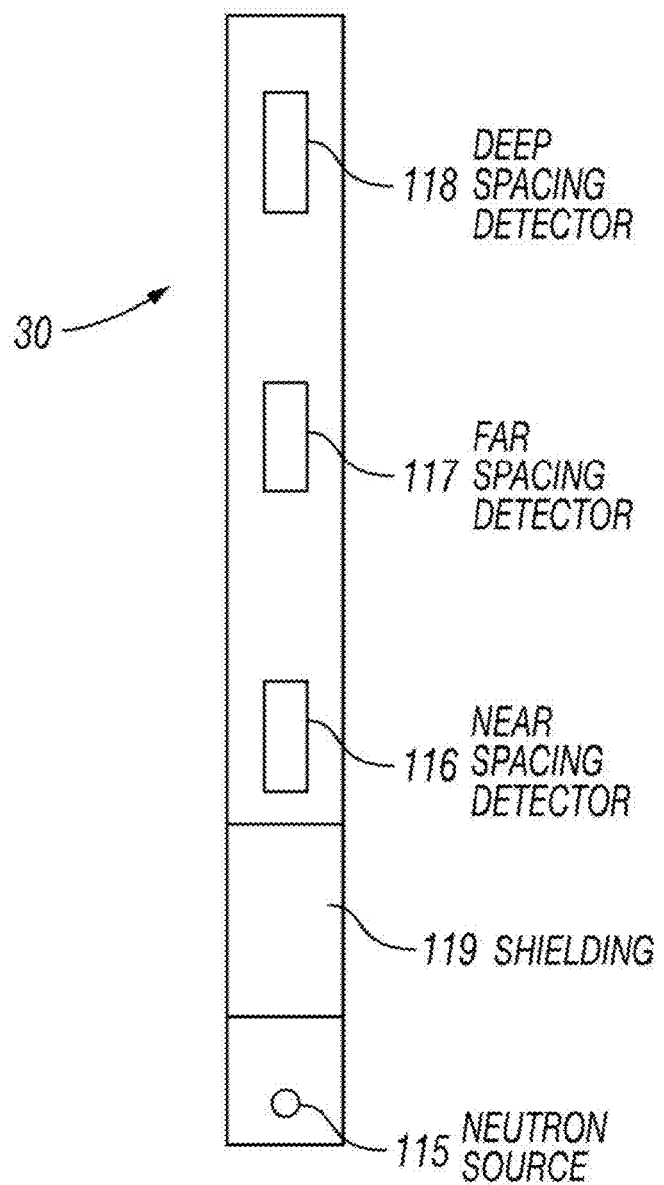
FIG. 1D shows a schematic representation of an example multi-detector neutron well logging instrument.

FIG. 1D shows a schematic cross section of an example neutron well logging instrument structure. Three detectors 116, 117, 118 at various longitudinal spacings from a neutron source 115 are indicated, but for some embodiments a single detector may suffice. The detectors 116, 117, 118 may be gamma ray detectors such as scintillation detectors. Shielding 119 between the neutron source 115 and the gamma ray detectors 116, 117, 118 may reduce or prevent the direct passage of radiation from the neutron source 115 to the detectors 116, 117 and 118. The neutron source 115 may be a pulsed neutron generator may be based on the deuterium-tritium reaction (with source energy of 14.1 MeV, the deuterium-deuterium reaction (with a source energy of about 2.45 MeV) or any other suitable reaction. Methods according to the present disclosure may be applied to any form of neutron logging instrument with the above described detectors and/or neutron sources.

In the embodiments of a neutron well logging instrument shown in and explained with reference to FIGS. 1A, 1B and 1D, the detectors 116, 117, 118 may be gamma ray detectors, e.g., scintillation counters. Scintillation counters may comprise a scintillation crystal (various compositions of which will be described below) coupled to a photomultiplier. A signal output of the photomultiplier may be coupled to a multichannel analyzer (MCA) that measures an amplitude of a voltage pulse generated in the photomultiplier as a result of detection of a gamma ray. Such devices may be implemented, for example in the circuitry shown at 120 in FIG. 1A. Voltage pulse amplitude is generally related to the energy of the corresponding detected gamma ray. Thus numbers of detected gamma rays may be counted within selected time intervals and such number may be analyzed with respect to their energy.

Methods according to the present disclosure may enable determining formation properties such as porosity and fluid content in formation pore spaces with more accuracy and less computational cost than neutron-neutron porosity measurements.

Figure 2:
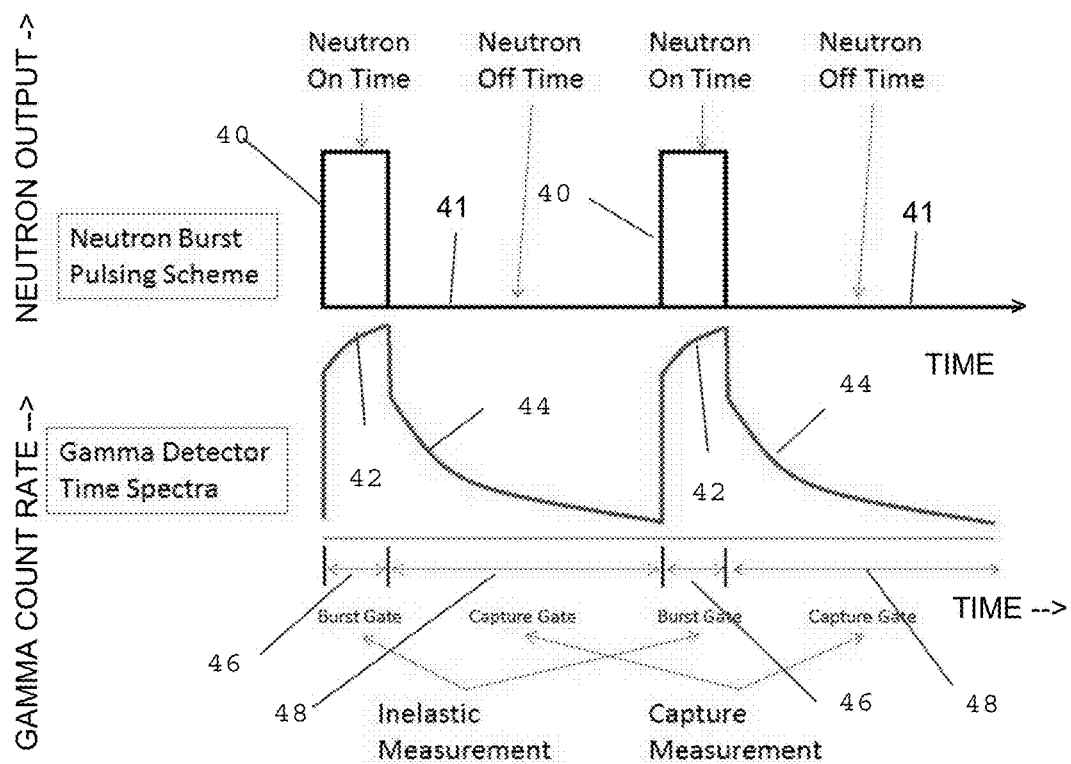
FIG. 2 shows graphs of examples of neutron source "burst" pulsing timing and the associated time spectrum of gamma rays measured using a gamma ray detector.

FIG. 2 shows schematically an example of a neutron burst timing arrangement when a pulsed neutron source is used, and timing of gamma ray detection with reference to the times at which neutrons are generated. The top panel shows neutron output with respect to time. Neutrons are generated for a selected period of time 40 and then neutron output is stopped for another period of time 41. The foregoing sequence may be repeated many times. The bottom panel shows an illustration of numbers of gamma rays detected with reference to the time shown in the top panel. The observed features, increasing gamma ray count rate at 42, and exponentially decreasing gamma ray count rate at 44 correspond to the neutrons being generated at 40 and not being generated at 41. A burst gate 46 may be defined as a gamma ray detection time interval during which the neutrons are generated, and a capture gate 48 may be defined as a gamma ray detection time interval during which neutrons are not being generated. The measured gamma ray counts during the burst gate will contain gamma rays generated mainly from inelastic neutron scattering and neutron capture events. The measured counts during the capture gate will contain gamma rays generated mainly from capture events. In reality, the pulsing scheme and the burst/capture gates can be more complex than this. See, for example, U.S. Pat. No. 6,703,606 issued to Adolph. In any event for purposes of the present disclosure, a burst gate represents the time interval, during which inelastic gamma rays dominate the detected gamma rays, while during the capture gate inelastic interactions are substantially absent and capture gamma rays dominate the detected gamma rays.

The particular neutron generated timing arrangement used in any embodiment is not relevant to the concept of the present disclosure, which can be applied to any kind of neutron generation timing arrangement. The neutron generator may also run in DC mode without any pulsing. Other neutron generation timing arrangements that may be expected to work with methods according to the present disclosure include, for example those described in U.S. Pat. No. 4,926,044 issued to Wraight referred to a dual-burst scheme, which has one short burst followed by a short decay gate, and a long burst followed by a long decay gate. U.S. Pat. No. 6,703,606 issued to Adolph discloses a neutron generation timing arrangement similar to one that may be used advantageously with methods according to the present disclosure. The timing arrangement disclosed in the '606 patent contains a sequence of short neutron "bursts", which are separated by a short decay gate and a long decay gate after the last short burst. U.S. Pat. No. 7,365,307, issued to Stoller et al. discloses a similar pulsing scheme.

A capture gamma ray detector ratio (capture ratio) may be defined as the detector count rate in the capture gate of one detector, e.g., 116 in FIG. 1D, at a first axial spacing from the neutron source (115 in FIG. 1D) divided by the detector count rate in the capture gate of another detector, e.g., 118 in FIG. 1D at a different axial spacing from the source. It may be desirable that the capture gates of such two detectors are the same (i.e., they occupy the same time interval), but the capture gate of each of such two detectors may also be different.

The capture ratio is very sensitive to the presence of hydrogen (i.e., the hydrogen index—"HI") in both the wellbore and in the surrounding formations. This is because the detected capture gamma rays are an indirect measurement of the thermal neutron flux, the intensity of which is highly dependent on the density of hydrogen nuclei proximate the well logging instrument.

Figure 3:
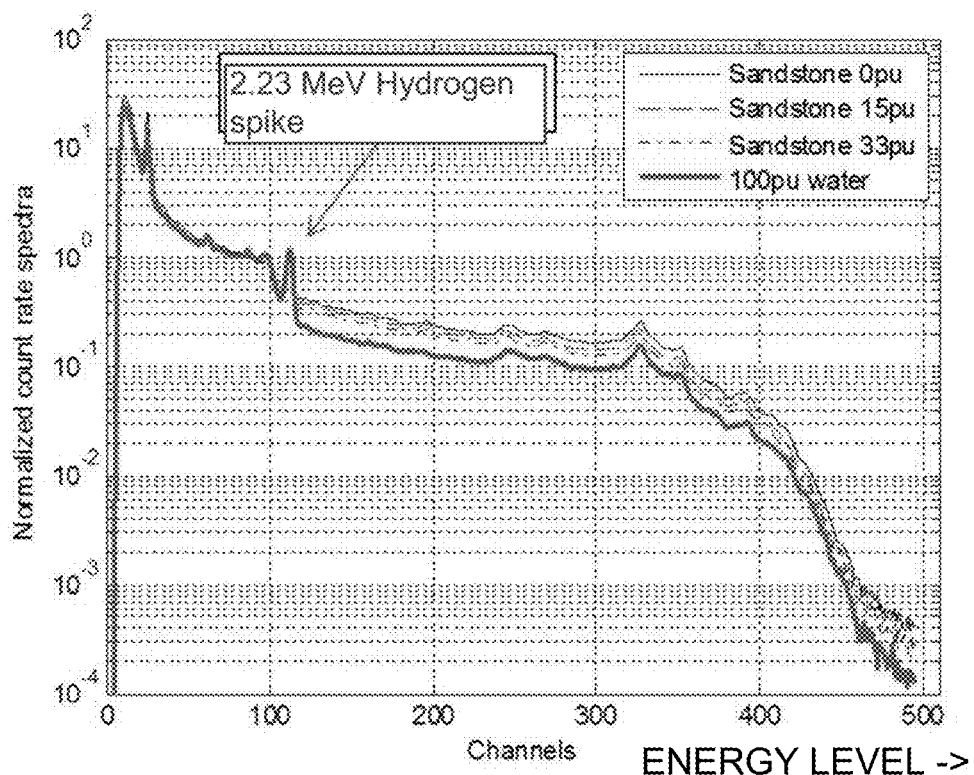
FIG. 3 shows a graph of near detector (see FIG. 1D and using a LaBr scintillator) gamma ray energy spectra for gamma rays detected in the capture gate shown in FIG. 2.
Figure 4:
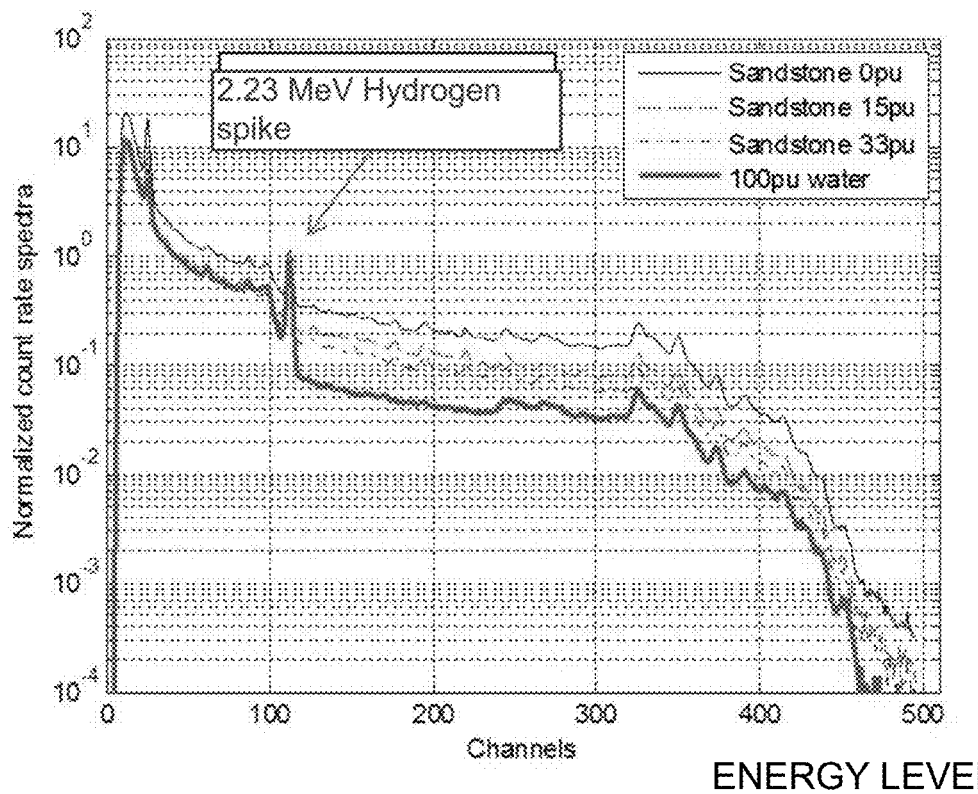
FIG. 4 shows a graph of far detector (see FIG. 1D and using LaBr scintillator) energy spectra in the capture gate.
Figure 5:
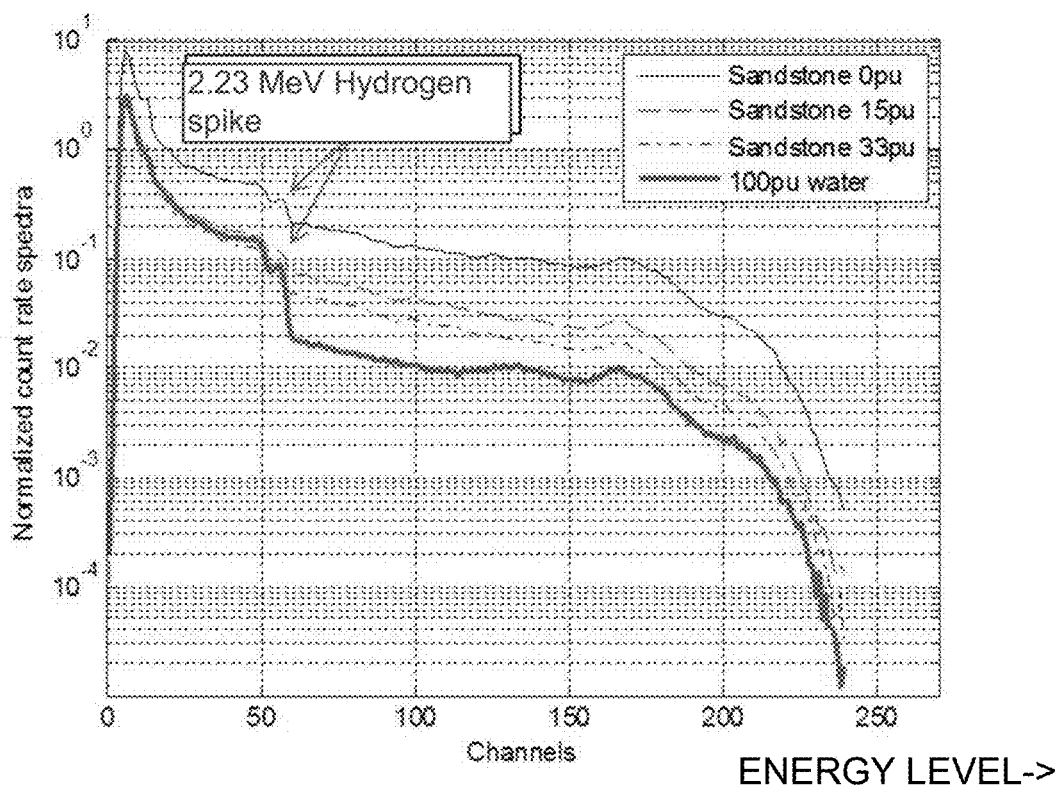
FIG. 5 shows a graph of deep detector (see FIG. 1D and using a YAP scintillator) energy spectra in the capture gate.

As explained above, scintillation type gamma ray detectors can be used to measure not only time spectra, but also energy spectra of detected gamma rays. FIGS. 3, 4 and 5 show, respectively, laboratory measurements of detected gamma ray energy spectra using three gamma ray detectors each at an axial spacing from the neutron source such as shown in FIG. 1D during the capture gates as shown at 48 in FIG. 2. The laboratory conditions include an 8 inch diameter wellbore having therein cemented a 5½ inch O.D. steel casing of specific weight 15.5 pounds per foot length casing, American Petroleum Institute (API) class H cement in the annular space between the casing and the wall of the wellbore. The wellbore is filled with fresh water. The four curves in each of FIGS. 3-5 each shown the gamma ray count rate in the capture gate in fresh water filled sandstone having, respectively, 0 p.u. (percent porosity), 15 p.u., 33 p.u. and 100 p.u. All the count rates displayed have been normalized with reference to the actual neutron output of the source, which was measured using a source neutron monitor (e.g., a neutron detector placed proximate to the source and having no shielding between the source and the neutron detector).

Hydrogen nuclei can capture thermal neutrons and release 2.23 million electron volt (MeV) energy gamma rays. A counting rate spike corresponding to such hydrogen capture gamma rays is visible in all energy spectra that comprise an energy level of 2.23 MeV. Note that depending on the scintillation crystal energy resolution. For example, lanthanum bromide (LaBr$_3$) has very sharp resolution, while yttrium aluminum perovskite activated by cerium (YAlO$_3$:Ce, abbreviated YAP:Ce) has moderate resolution; the spike may be more or less pronounced depending on the detector energy resolution The amplitude differences among the four energy spectra in each of FIGS. 3, 4 and 5 correspond to the 4 formation above described fresh water-filled sandstone porosities correspond to the porosity sensitivity of each detector, because all spectra were acquired over the same time and with the same neutron output. The porosity sensitivities above and below the hydrogen spike at 2.23 MeV are quite different for each detector. FIG. 3 shows the 4 energy spectra of the near detector (116 in FIG. 1D), which is located at the shortest spacing from the neutron source (115 in FIG. 1D). From MCA channel 1 (the lowest energy level) to MCA channel 110 (hydrogen spike channel), the 4 energy spectra have almost the same amplitude and show almost no porosity sensitivity, that is, the gamma ray detector count rates substantially do not vary with respect to formation porosity. However, from MCA channel 110 to the highest energy MCA channel, the amplitude of the spectra decrease monotonically as porosity increases, that is the counting rate at any MCA channel decreases as porosity increases.

FIG. 4 shows the 4 energy spectra of the far detector (117 in FIG. 1D), which is located at a greater axial distance from the source than the near detector. The amplitudes of the spectra below the hydrogen spike channel (around MCA channel 110) show some differences with respect to porosity and therefore do have some porosity sensitivity. However, the porosity sensitivity is not a monotonic function of porosity. The count rate at any energy level below the 2.23 MeV hydrogen spike decreases when porosity increases from 0 to 33 p.u., and the count rate at any energy level increases when porosity increases from 33 p.u. to 100 p.u. The spectral amplitude (count rate with respect to energy level) below the hydrogen spike for 100 p.u. (i.e., in a fresh water tank) is almost the same as the spectral amplitude for 15 p.u. fresh water-filled sandstone.

On the other hand, the gamma ray counting rate with respect to energy at energy levels above the 2.23 MeV hydrogen spike has larger porosity sensitivity and decreases monotonically as porosity increases. FIG. 5 shows a similar correspondence of amplitude spectra for the deep detector (118 in FIG. 1D) which is located at the longest spacing among the three.

In one embodiment, one may compute a gamma ray detector count rate by integrating an entire energy spectrum in a capture gate as defined above or in any other selected time interval, starting at a low energy level threshold, typically in the range of 10 to 100 keV in order to remove electronic noise (e.g., "dark currents" from the photomultiplier). By integrating such energy spectra the amplitude of the spectra below the hydrogen spike dominates the total count rate resulting from the integration. Note that the Y-axis in FIGS. 3, 4 and 5 is on a logarithmic scale; the amplitude (total count rate) below the hydrogen spike can be 1 order of magnitude higher than the amplitude above the hydrogen spike.

In one embodiment, the amplitude spectrum may be integrated using a lowest energy threshold which is higher than energy level of the hydrogen spike to compute a count rate in any selected time interval (e.g., the capture gate shown at 48 in FIG. 2). Such count rate which will have much larger porosity sensitivity than a count rate obtained by integrating the energy spectrum from the electronic noise threshold (e.g., 10 to 100 keV lower threshold). Such count rate and will also be monotonically related to porosity from 0 to 100 p.u. In other embodiments, determining a gamma ray count rate without a hydrogen capture gamma ray component may be performed using gamma ray spectroscopy techniques known in the art. Gamma ray counts in a measured spectrum may be characterized by the elemental nuclei that create them, such as prompt capture gamma rays from Si, Ca, Fe, and H, among other elemental nuclei. See, for example, chapters 13, 14 and 15.5, Ellis and Singer, *Well Logging for Earth Scientists*, 2nd edition (Springer, 2007), the entire content of which is hereby incorporated by reference. After spectroscopy, one can simply remove the gamma ray counts attributable to hydrogen capture and compute a gamma ray count rate substantially excluding effects of hydrogen capture gamma rays.

Figure 6:
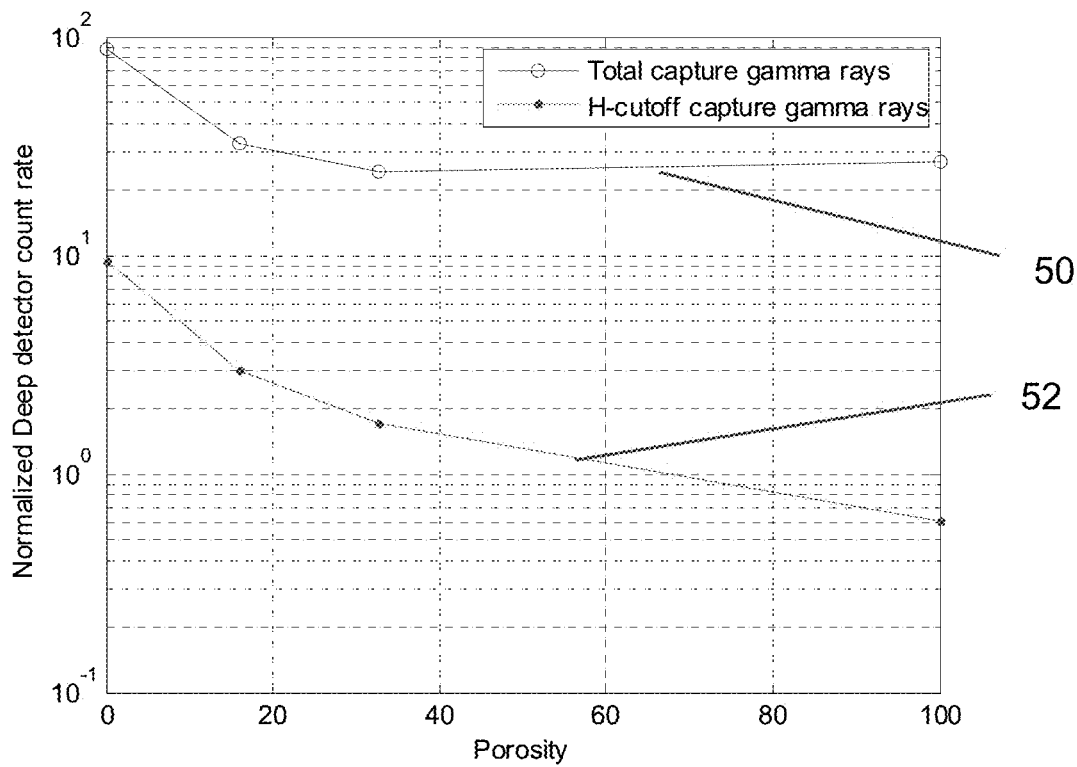
FIG. 6 shows a graph of neutron output normalized gamma ray detector count rates with and without the contribution from hydrogen for the deep detector (FIG. 1D).

FIG. 6 shows the deep detector (118 in FIG. 1D) count rate for the laboratory conditions described with reference to FIGS. 3-5, computed in two different ways. One way, shown by curve 50 is to integrate the whole energy spectrum beginning approximately at the electronic noise threshold energy level (total capture gamma ray count rate); the other way, shown by curve 52 is to integrate the spectrum for gamma ray energy above the hydrogen spike energy level at 2.23 MeV (H-cutoff capture gamma ray count rate). Curve 50 is not monotonically related to porosity, and may be difficult to use in determining neutron porosity from capture gamma rays. Curve 52 is monotonically related to porosity and has larger porosity sensitivity (change in count rate with respect to porosity).

Figure 7:
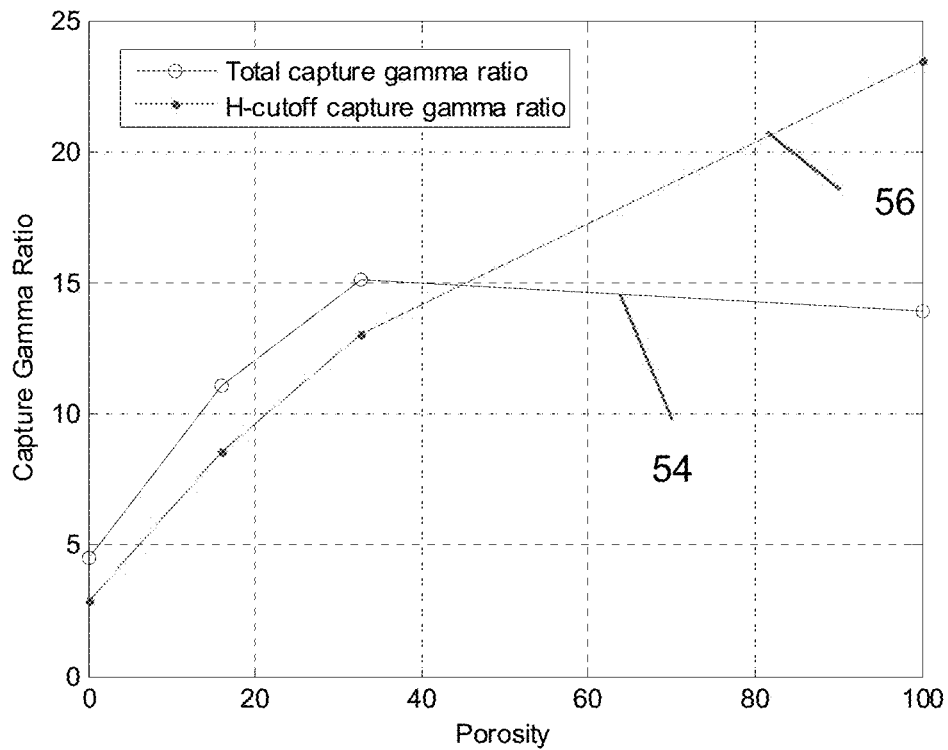
FIG. 7 shows a graph of near/deep capture gate gamma ray count rate ratio with and without hydrogen contribution.

Similar behavior of capture gamma rays count rate measurements from which hydrogen capture gamma rays have been excluded may be observed for detector count rate ratios as well. FIG. 7 shows near detector (116 in FIG. 1D) to deep detector (118 in FIG. 1D) gamma ray count rate ratios for individual detector count rate computed in the same two ways as explained with reference to FIG. 6. The count rate ratio based on integrating whole spectra (e.g., above the electronic noise threshold) to compute a count rate for each detector, shown at curve 54, is not a monotonic function of porosity. The count rate ratio based on detector count rates determined by integrating the spectrum above the hydrogen spike energy level, shown at curve 56 is a monotonic function of porosity and has good porosity sensitivity.

Figure 8:
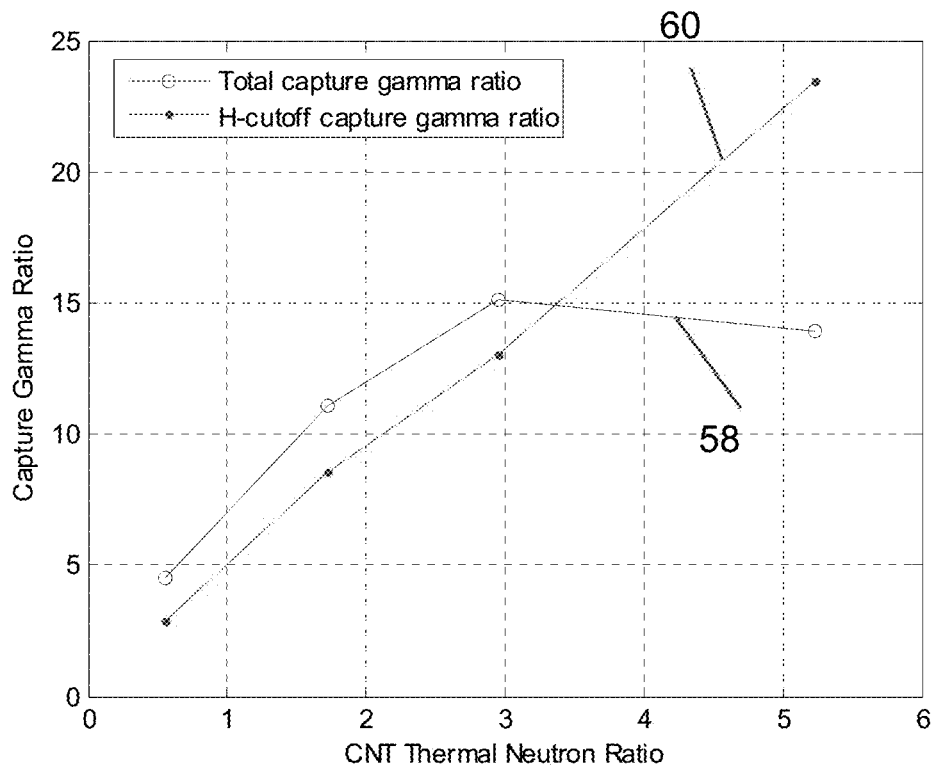
FIG. 8 shows a graph of near/deep detector capture gamma ray count rate ratio with and without hydrogen contribution with respect to near/far neutron detector count rate ratio for a chemical isotope source neutron well logging instrument using thermal neutron detectors.

FIG. 8 shows the same count rate ratios of FIG. 7 at curves 58 and 60, respectively, plotted as a function of thermal neutron detector count rate ratios from a conventional neutron well logging instrument using a chemical isotope (americium-beryllium) neutron source and helium-3 proportional thermal neutron detectors. The count rate ratios shown in FIG. 8 measured using the same laboratory conditions for each of the two different types of well logging instrument. FIG. 8 demonstrates, by curve 60 that the gamma ray detector count rate ratio with hydrogen capture gamma ray effects excluded has a nearly linear relationship with the conventional "neutron-neutron porosity" well logging instrument neutron count rate ratios.

A possible disadvantage of excluding hydrogen capture gamma rays in a total capture gamma ray detector count rate by using a spectral integration threshold above the hydrogen spike energy level is to reduce the total numbers of detected gamma rays, thus resulting in higher statistical noise. However, as compared to the detector count rates using conventional "neutron-neutron porosity" instruments, the gamma ray detector count rates are typically more than 1 order of magnitude higher than corresponding thermal neutron detector count rates, so that the statistical noise is still acceptable for accurate well log measurements.

The foregoing phenomenon may be explained by two physical reasons. One reason is due to neutron and gamma ray transport competing. Generally, when porosity increases, the thermal neutron flux decreases proximate a detector as the detector is located progressively further away from a neutron source. The foregoing is because more hydrogen nuclei will be present along the neutron transport path to slow down neutrons from the source and increase the probability of thermal neutron capture before the neutrons can travel further. A gamma ray detector, however, detects thermal neutrons indirectly by counting prompt capture gamma rays. When porosity increases, formation density will decrease and so correspondingly does attenuation of such prompt capture gamma rays. Thus, more gamma rays can reach the detector. These two effects offset with each other, especially for hydrogen capture gamma rays which have a relatively low characteristic energy of 2.23 MeV and are thus more sensitive to formation density. For gamma rays with higher energy, therefore, the gamma rays are less affected by formation density sensitivity. At such higher gamma ray energy levels, the neutron response dominates, therefore such gamma rays will have more porosity sensitivity.

Another reason for the foregoing characteristics of hydrogen capture-adjusted gamma ray detection is offsetting effects of neutron transport and neutron capture. More hydrogen nuclei (i.e., higher hydrogen index) disposed between the neutron source and the gamma ray detector will slow down neutrons earlier and lead to lower thermal neutron flux. On the other hand, more hydrogen nuclei (higher hydrogen index) can capture more thermal neutrons and emit more 2.23 MeV gamma rays.

It is difficult to distinguish the foregoing two effects on capture gamma ray detection rates. The offsetting effects of neutron transport and neutron capture probably are the dominant effects in the detected gamma ray count rate. To summarize, by removing from the gamma ray detector count rate those gamma ray detections caused by hydrogen capture gamma rays, it is possible to determine the neutron porosity sensitivity and the neutron porosity.

Typically, a "neutron-gamma porosity" measurement has a very different response in shale and high porosity compared to conventional "neutron-neutron porosity" measurements. A gamma ray detector count rate ratio with hydrogen capture gamma rays excluded has a response closer to the conventional "neutron-neutron porosity" than one which includes hydrogen capture gamma rays. Therefore, embodiments of a method according to the present disclosure can be used to better replicate conventional "neutron-neutron porosity" well logging instrument measurements. The count rate or count rate ratio without hydrogen capture gamma rays can be used to provide a neutron porosity measurement independently, or such measurements may be enhanced by combining the hydrogen capture gamma ray-excluded count rate or count rate ratios with the count rate or count rate ratios of detected gamma rays with hydrogen capture gamma rays included. These enhancements may include, for example and without limitation, improving the environmental (wellbore fluid and instrument wellbore position) corrections and replicating conventional "neutron-neutron porosity" measurements.

The different responses of the count rate or count rate ratio with and without hydrogen capture gamma rays may contain some formation density information, and thus may be used to provide or enhance the neutron-gamma density (NGD) measurements.

Methods according to the present disclosure may enable the use of well logging instruments including only gamma ray detectors to make measurements corresponding to formation hydrogen index (and therefore neutron porosity) comparable to those made using conventional neutron-neutron well logging instruments. Because well logging instruments using such gamma ray detectors and controllable neutron sources, e.g., pulsed neutron sources may be configured to measure other formation properties such as thermal neutron capture cross section, method according to the present disclosure may be combined with method for operating such pulsed neutron well logging instruments to measure both thermal neutron capture cross section and neutron porosity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating a formation, comprising:
receiving, into a computer, a plurality of detected capture gamma rays resulting from imparting neutrons into a formation, the plurality of detected capture gamma rays each characterized by an energy level thereof, the plurality of detected capture gamma rays detected at a distance from a position of imparting the neutrons into the formation;
removing, via a processor of the computer, from the plurality of detected capture gamma rays, those of the plurality of detected capture gamma rays attributable to neutron capture by hydrogen nuclei;
normalizing, via the processor, the plurality of detected capture gamma rays having hydrogen neutron capture gamma rays removed therefrom with a reference to actually imparted neutron; and
determining, via the processor, a neutron porosity of the formation, based at least in part on the normalized plurality of detected capture gamma rays having hydrogen neutron capture gamma rays removed therefrom.

2. The method of claim 1 wherein the neutrons are imparted by a pulsed neutron source and the reference to actually imparted neutrons is measured by a neutron monitor proximate to the position of imparting the neutrons into the formation.

3. The method of claim 2 wherein the neutrons are imparted by the pulsed neutron source for a first selected time interval.

4. The method of claim 3 wherein the plurality of capture gamma rays are detected for a second selected time interval after an end of the first time interval.

5. The method of claim 1 wherein the plurality of capture gamma rays are detected by a scintillation detector.

6. The method of claim 5 wherein the plurality of detected capture gamma rays are each characterized by an energy level thereof by transmitting detected capture gamma ray signals from a detector to a multichannel analyzer.

7. The method of claim 6 wherein the removing the capture gamma rays attributable to neutron capture by hydrogen nuclei comprises, in the computer, spectrally analyzing an output of the multichannel analyzer to determine a presence of selected elements in the formation, and removing therefrom effects of hydrogen from the spectrally analyzed output.

8. The method of claim 6 wherein the removing the capture gamma rays attributable to neutron capture by hydrogen nuclei comprises, in the computer, integrating an output of the multichannel analyzer beginning at an energy level at least at an energy level of capture gamma rays emitted by neutron capture by hydrogen nuclei.

9. A method for well logging, comprising:
moving a well logging instrument along a wellbore drilled through subsurface formations, the well logging instrument comprising a neutron source and a first gamma ray detector spaced apart by a distance from the neutron source;
imparting neutrons into the formation using the neutron source;
detecting capture gamma rays resulting from the imparting neutrons into a formation at the first gamma ray detector;
characterizing energy levels of the detected capture gamma rays;
removing, from the detected capture gamma rays, those of the detected capture gamma rays attributable to neutron capture by hydrogen nuclei;
normalizing the detected capture gamma rays having hydrogen neutron capture gamma rays removed with a reference to an actual output of the neutron source; and
determining a porosity of the formation, based at least in part on the normalized detected capture gamma rays having hydrogen neutron capture gamma rays removed therefrom.

10. The method of claim 9 wherein the neutrons are imparted by a pulsed neutron source for a first selected time interval.

11. The method of claim 10 wherein the reference to the actual output of the neutron source is measured by a neutron monitor placed proximate the neutron source.

12. The method of claim 10 wherein the capture gamma rays are detected for a second selected time interval after an end of the first time interval.

13. The method of claim 9 wherein the capture gamma rays are detected by a scintillation detector.

14. The method of claim 9 wherein characterizing the energy levels of the detected capture gamma rays comprises transmitting detected capture gamma ray signals from the first gamma ray detector to a multichannel analyzer.

15. The method of claim 14 wherein the removing the capture gamma rays attributable to neutron capture by hydrogen nuclei comprises integrating an output of the multichannel analyzer beginning at an energy level at least at an energy level of gamma rays emitted by neutron capture by hydrogen nuclei.

16. The method of claim 14 wherein the removing the capture gamma rays attributable to neutron capture by hydrogen nuclei comprises, in a computer, spectrally analyzing an output of the multichannel analyzer to determine a presence of selected elements in the formation, and removing therefrom effects of hydrogen from the spectrally analyzed output.

* * * * *